Figure 1:
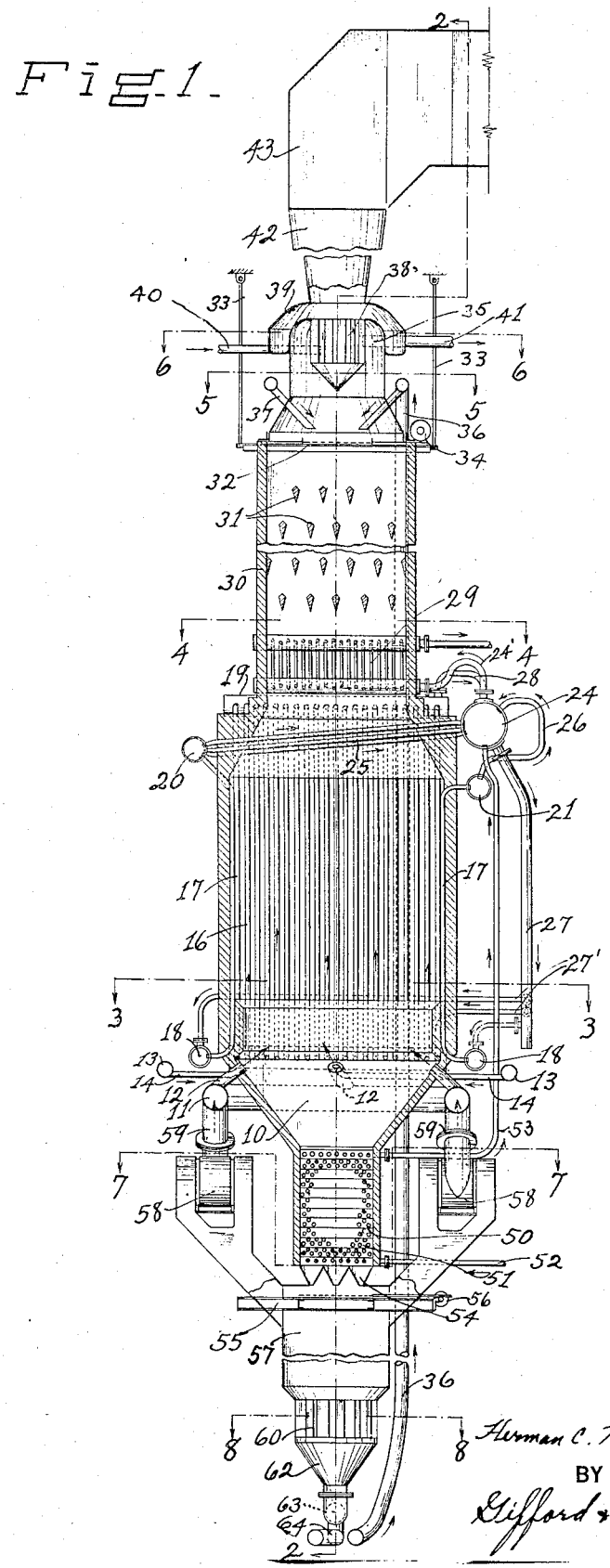

April 25, 1933.    H. C. HEATON    1,905,283
PROCESS AND APPARATUS FOR GENERATING VAPORS
Original Filed Jan. 14, 1927    4 Sheets-Sheet 1

INVENTOR
Herman C. Heaton
BY
Gifford & Scull
ATTORNEYS

April 25, 1933.  H. C. HEATON  1,905,283
PROCESS AND APPARATUS FOR GENERATING VAPORS
Original Filed Jan. 14, 1927    4 Sheets-Sheet 2
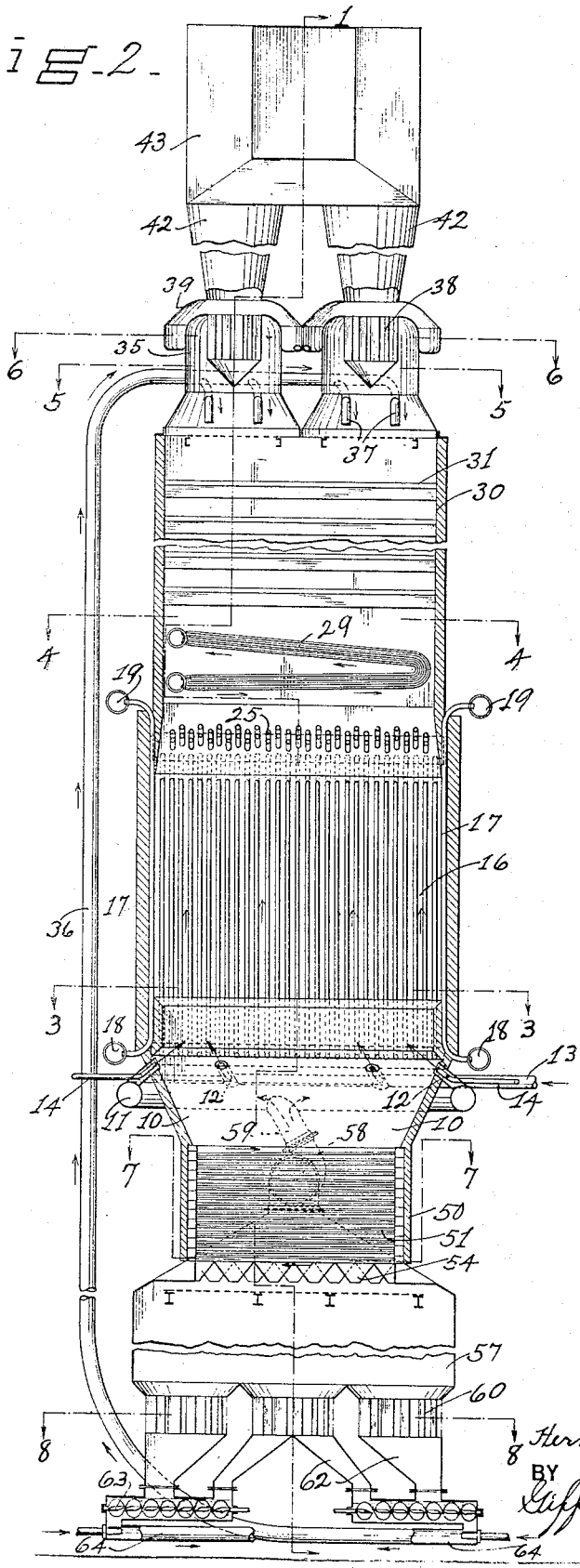

April 25, 1933.   H. C. HEATON   1,905,283
PROCESS AND APPARATUS FOR GENERATING VAPORS
Original Filed Jan. 14, 1927   4 Sheets-Sheet 3
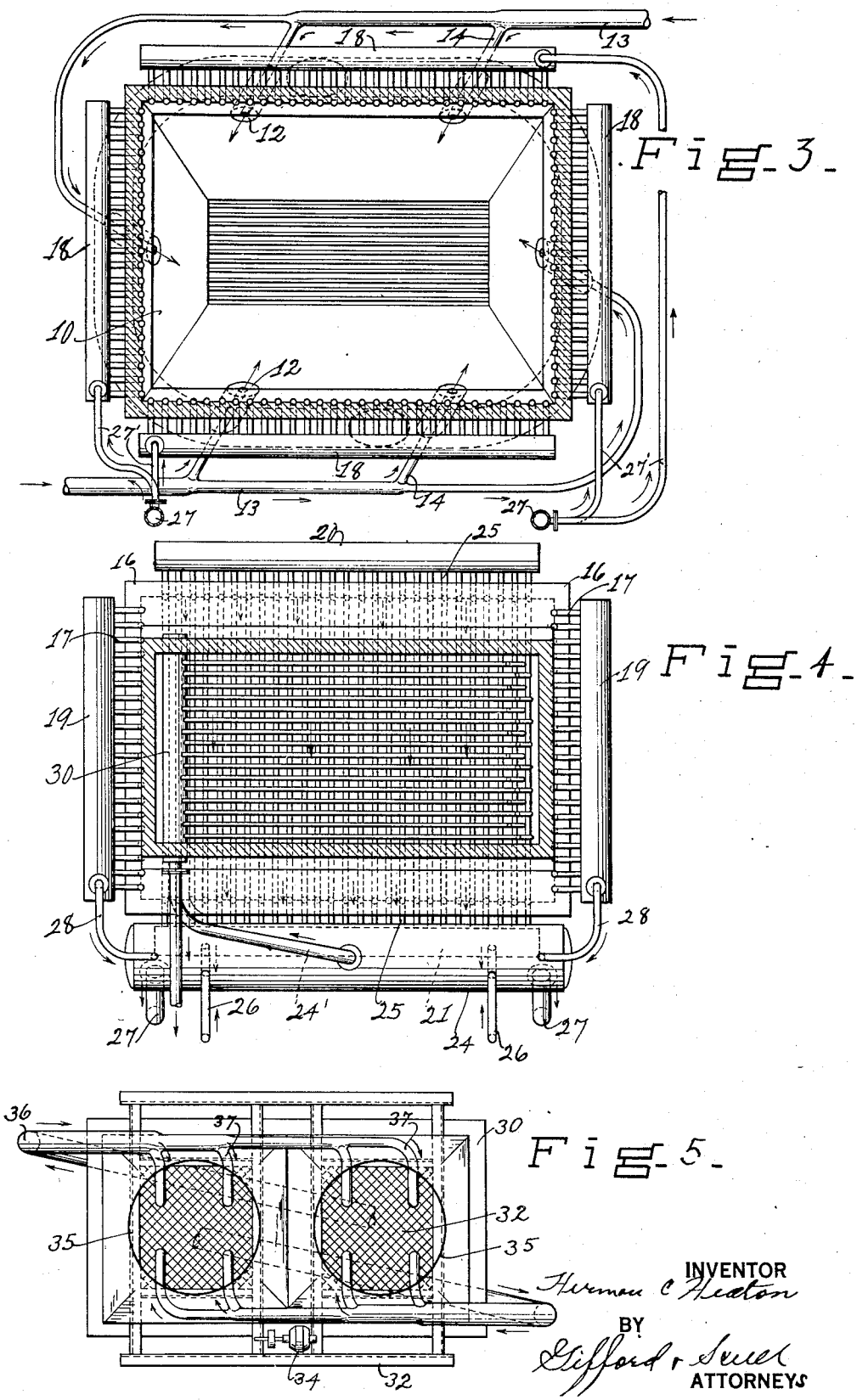

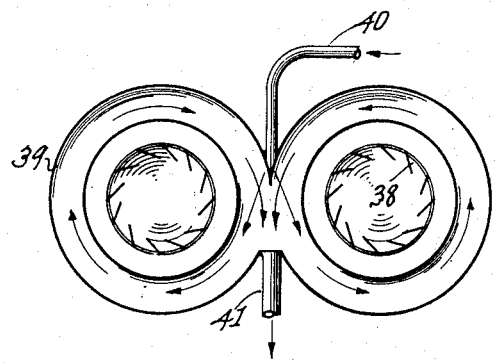
Fig-6-
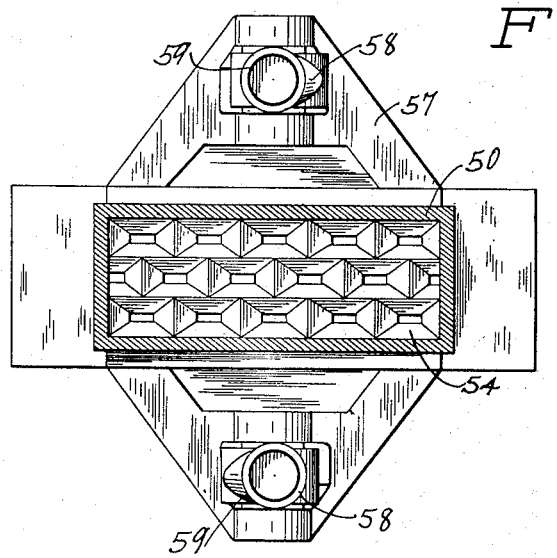
Fig-7-
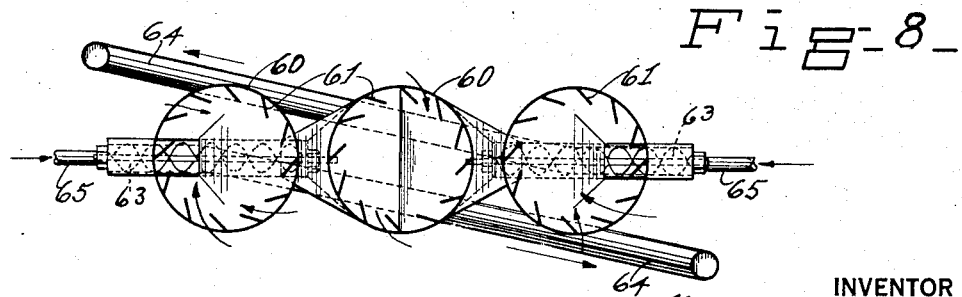
Fig-8-
INVENTOR
Herman C. Heaton
BY
Gifford & Sewell
ATTORNEYS Patented Apr. 25, 1933

1,905,283

UNITED STATES PATENT OFFICE

HERMAN C. HEATON, OF CHICAGO, ILLINOIS

PROCESS AND APPARATUS FOR GENERATING VAPORS

Application filed January 14, 1927, Serial No. 161,053. Renewed July 12, 1932.

This invention relates to the production of vapors from liquids by generating heat by combustion of fuel and transmitting the heat to the liquid while, at the same time, passing segregated particles of granular solid material, such as sand or steel shot, for example, into contact with the hot products of combustion after they leave the combustion zone, and also while passing through the combustion zone, thus absorbing heat which is utilized for preheating the liquid from which the vapors are generated, and also for preheating the air that is used for combustion purposes.

The invention will be understood from the description in connection with the accompanying drawings, in which Fig. 1 is a vertical section along the line 1—1 of Fig. 2 through an illustrative embodiment of the apparatus for carrying out the invention; Fig. 2 is a similar section along the line 2—2 of Fig. 1; Fig. 3 is a section along the line 3—3 of Fig. 1 or 2; Fig. 4 is a section along the line 4—4 of Fig. 1 or 2; Fig. 5 is a section along the line 5—5 of Fig. 1 or 2; Fig. 6 is a section along the line 6—6 of Fig. 1 or 2; Fig. 7 is a section along the line 7—7 of Fig. 1 or 2 and Fig. 8 is a section along the line 8—8 of Fig. 1 or 2.

In the drawings reference character 10 indicates an ignition chamber into which fuel and air may be introduced, this chamber having the bottom walls converging toward each other. An air conduit 11 surrounds this chamber and has branch pipes 12 extending into the same. Fuel or gas pipes 13 have branches 14 that extend through the branch pipes 12 and open into the chamber 10.

A combustion chamber 16 is located immediately above the ignition chamber 10, and the walls of this chamber are lined with the tubes 17 that are preferably vertically disposed, and are connected to a source or sources of liquid supply. Headers 18 (Figs. 1, 2 and 3) are disposed near the bottom of the chamber 16 on the outside thereof, to which the lower ends of the tubes 17 are connected. Headers 19 (Figs. 2 and 4) are located near the top of the combustion chamber 16 on the outside and on opposite sides thereof, and the upper ends of the tubes 17 along the adjacent walls of the chamber are connected thereto. Headers 20 and 21 (Figs. 1 and 4) are similarly located near the top of the combustion chamber 16 on opposite sides, and the upper ends of the other tubes 17 are connected thereto. A vapor and liquid drum 24 is located outside of the combustion chamber above the drum 21, and is connected by tubes 25 extending across the combustion chamber to the header 20. Tubes 26 connect the header 21 to the vapor and liquid drum 24, and tubes 27 with branches 27' connect the headers 18 to the vapor and liquid drum 24. Tubes 28 connect the drum 24 to the headers 19. Pipe 24' leads from the drum 24 to the superheater 29 that is located above the tubes 25.

A cooling chamber 30 is located above the combustion chamber 16 and is provided with staggered distribution members 31 extending across the chamber, and are preferably triangularly shaped in cross-section. A riddle or vibrating screen 32 is located at the top of the cooling chamber 30, being suspended from fixed supports by means of the straps 33 and vibrated by means of the motor 34. Two hoods 35 (Figs. 1, 2 and 5) are located at the top of the cooling chamber 30, and pipes 36 extending from the lower end of the device have branches 37 projecting into these hoods. The upper part of each one of the hoods 35 is cylindrical in shape, and has located therein tangentially disposed guide vanes 38 (Fig. 6). Enlarged chambers 39 surround the upper ends of the hoods 35. An inlet pipe 40 extends into one side of the enlarged chambers 39, and an outlet pipe 41 extends from the other side thereof so that soot may be blown out of the chambers 39 periodically. Conduits 42 lead from the chambers 39 to the stack or chimney 43.

A rectangularly-shaped box or chamber 50 constituting a feed liquid heater is located below the ignition chamber 10, and a bank of tubes 51 through which liquid may be circulated is located in this chamber. A liquid inlet for the bank of tubes is shown at 52, and an outlet 53 therefrom leads to the vapor and water drum 24. Pyramidal-shaped outlets 54 (Figs. 1 and 7) are located at the bottom of the chamber 50, and a vibrating screen 55 is located below the outlets, this screen being vibrated by means of the motor 56.

An air preheater chamber 57 is located below the screen 55, and suction fans 58 are located in conduits leading away from opposite sides of the upper end of the preheater chamber 57. Pipes 59 lead from the outlet sides of the fans 58 into the air conduit 11 that surrounds the ignition chamber 10. A plurality of cylindrical air inlets 60 with open sides (Figs. 1, 2 and 8) are located at the bottom of the preheater 57, and tangentially disposed guide vanes 61 are located inside of the same to give the incoming air a swirling motion. Openings 62 are provided at the bottom of the cylindrical inlets 60, and screw conveyors 63 are located beneath the outlets to carry solid material to the conduits 64 that lead to the pipes 36. Air inlets 65 (Fig. 8) lead into the pipes 36.

This device is especially adapted for generating vapors from liquids at high rate and efficiency, and is suitable for such purposes, for example, as generating steam from water or vapors from mercury, etc., for power, heating or other purposes.

The operation is as follows: Fuel is introduced through the pipes 13 and branches 14 into the ignition chamber 10, and air that has been preheated, as will be described below, is simultaneously introduced through the conduit 11 and branches 12 into the ignition chamber. The hot products of combustion rise in the combustion chamber 16 and heat the tubes 17 and 25, generating steam or vapor therein which passes to the drum 24. The products of combustion that have given up a portion of their heat in heating the tubes 17 and 25 then rise through the cooling zone 30, and granulated solid material, such as sand, steel shot or the like, is fed through the pipes 36 and branches 37, onto the screen 32, from whence it is dropped as segregated particles by gravity through the cooling chamber 30, moving in counter-current direction to the products of combustion and absorbing heat therefrom, the staggered cross members 31 serving to prevent the same from channeling. The solid particles also absorb heat as they pass downwardly through the combustion chamber 16 and ignition chamber 10. The products of combustion that have been cooled pass through the conduits 35 and are caused by the vanes 38 to partake of a whirling motion, by means of which the soot and dirt therein are deposited in the enlarged chambers 39, from which they can be removed periodically. The cooled products of combustion then pass into the stack 43.

The solid particles that have passed through the cooling, combustion and ignition chambers enter the feed liquid heater 50, heating the liquid contained in pipes 51 and then pass through the outlets 54 over the screen 55 and downwardly through the preheater 57, heating the air that comes in through the inlets 60. The hot particles then pass through the outlets 62 and are collected by the conveyors 63 and carried into the pipes 36 by means of which these solid particles are again carried into the hoods 35. This may be done by blowing air through the air inlets 65.

The air for combustion purposes which enters the air inlets 60 and is heated by the falling solid particles in the preheater 57 is carried through the side conduits by the suction fans 58, and is fed through the conduit 11 and inlets 12 into the ignition chamber 10 for combustion purposes.

The liquid from which the vapors are to be produced enters through the pipe 52 into the bank of tubes 51 located in the feed liquid heater 50, where it is heated to some extent by extracting heat from the solid particles passing downwardly through the chamber 50, thence the liquid passes through the pipe 53 into the drum 24, from whence it is distributed by means of the pipes 27 and branches 27' to the headers 18, thence into the tubes 17 where more heat is imparted thereto, thence into the headers 19, 20 and 21. The liquid or mixture of the same with steam or vapor passes from the headers 19 and 21 through the pipes 28 and 26, respectively, to the drum 24, while that from the header 20 passes through the tubes 25 to the same drum where the liquid and vapor are separated, the vapor or steam passing out through the pipe 24' to the superheater tubes, and thence to the main or place where the steam or vapor is to be used, and the liquid returning through the pipe 27 and branches 27' to the headers 18 and tubes 17.

I claim:

1. In a vapor generator, a combustion chamber, steam generating surfaces around said chamber, means for passing hot products of combustion upwardly through said chamber and segregated particles of heat absorbent non-combustible solid material downwardly through said chamber in contact with said hot products of combustion, and means for utilizing the heat absorbed by said particles from said hot products of combustion after said particles have passed out of said chamber for heating the liquid for said vapor generator.

2. In a vapor generator, a combustion chamber, means for passing hot products of combustion upwardly through said chamber and segregated particles of heat absorbent non-combustible solid material downwardly through said chamber in contact with said hot products of combustion, said combustion chamber having liquid containing tubes along the side thereof, and a liquid heater below said chamber in position to be contacted by said particles.

3. In a vapor generator, a combustion chamber, means for passing hot products of combustion upwardly through said chamber and segregated particles of heat absorbent non-combustible solid material downwardly through said chamber in contact with said hot products of combustion, said combustion chamber having upwardly directed liquid containing tubes along the side thereof, and a liquid heater below said chamber in position to be contacted by said particles.

4. In a vapor generator, a combustion chamber, means for passing hot products of combustion upwardly through said chamber and segregated particles of heat absorbent non-combustible solid material downwardly through said chamber in contact with said hot products of combustion, said combustion chamber having liquid containing tubes along the side thereof and vapor tubes across it, and a liquid heater below said chamber in position to be contacted by said particles.

5. In a vapor generator, a combustion chamber, means for passing hot products of combustion upwardly through said chamber and segregated particles of heat absorbent non-combustible solid material downwardly through said chamber in contact with said hot products of combustion, means to transfer heat from said particles to liquid from which vapor is to be generated, and means to pass said liquid along the walls of said chamber.

6. In a vapor generator, a combustion chamber, and means to pass non-combustible solid material in segregated particles and hot gas in countercurrent direction through said chamber in contact with each other, said chamber having liquid tubes along the side thereof, and a liquid heater below said chamber in position to be contacted by said particles.

7. In a vapor generator, a combustion chamber, and means to pass non-combustible solid material in segregated particles and hot gas in countercurrent direction through said chamber in contact with each other, said chamber having liquid tubes along the side thereof and a feed liquid heater below said chamber through which said material passes.

8. In a vapor generator, a chamber, means to pass non-combustible solid material in segregated particles and hot gas in countercurrent direction through said chamber in contact with each other, said chamber having liquid tubes along the side thereof and a feed liquid heater below the same through which said material passes, and means to feed fuel and air between said chamber and heater.

9. In a vapor generator, a combustion chamber, and means to pass non-combustible solid material in segregated particles and hot gas in countercurrent direction through said chamber in contact with each other, said chamber having liquid tubes along the side thereof, a feed liquid heater below said chamber, and a chamber containing said feed liquid heater and communicating with said combustion chamber, said feed liquid heater being heated by said solid material after it has passed through said combustion chamber.

10. In a vapor generator, a combustion chamber, means to pass non-combustible solid material in segregated particles and hot gas in countercurrent direction through said chamber in contact with each other, said chamber having liquid tubes along the side thereof, a feed liquid heater below said chamber, a chamber containing said feed liquid heater and communicating with said combustion chamber, and an air heater below said feed liquid heater.

11. In a vapor generator, a combustion a chamber, means to pass non-combustible solid material in segregated particles and hot gas in countercurrent direction through said chamber in contact with each other, said chamber having liquid tubes along the side thereof, a feed liquid heater below the same and communicating therewith, and an air heater below said feed liquid heater, and communicating with it, said feed liquid heater and air heater being supplied with heat by said solid material after it has passed through said combustion chamber.

12. In a vapor generator, a combustion chamber, means to pass non-combustible solid material in segregated particles and hot gas in countercurrent direction through said chamber in contact with each other, said chamber having liquid tubes along the side thereof, a feed liquid heater below the same and communicating therewith, an air heater below said feed liquid heater and communicating with it, said feed liquid heater and air heater being supplied with heat by said solid material after it has passed through said combustion chamber, and means to pass air from said air heater into said combustion chamber.

13. In a vapor generator, a combustion chamber, means to pass non-combustible solid material in segregated particles and hot gas in countercurrent direction through said chamber in contact with each other, said chamber having liquid tubes along the side thereof, a feed liquid heater below the same and communicating therewith, an air heater below said feed liquid heater and communicating with it, said feed liquid heater and air heater being supplied with heat by said solid material after it has passed through said combustion chamber, and means to pass air from said air heater into said combustion chamber without passing through said feed liquid heater.

14. In a vapor generator, a combustion chamber, means to pass non-combustible solid material in segregated particles and hot gas in countercurrent direction through said chamber in contact with each other, said chamber having liquid tubes along the side thereof, a feed liquid heater below the same and communicating therewith, an air heater below said feed liquid heater, means to pass air from said air heater into said combustion chamber, and means to pass liquid from said feed liquid heater into said tubes.

15. In a vapor generator, a combustion chamber, steam generating surfaces around said chamber, and means to pass non-combustible solid material in segregated particles and hot gas in countercurrent direction through said chamber in contact with each other, and also to cause said solid material to contact with said gas after said gas has left said chamber.

16. In a vapor generator, a combustion chamber, steam generating surfaces around said chamber, means to pass non-combustible solid material in segregated particles and hot gas in countercurrent direction through said chamber in contact with each other, and means to cause said solid material to contact with said gas after said gas has left said chamber, and to contact with cold air and heat it after said solid material has left said combustion chamber.

17. The process which comprises passing non-combustible solid material in segregated particles and hot gas into contact with each other in countercurrent direction and generating vapor by radiant heat from said solid material while in contact with said hot gas.

18. The process which comprises passing non-combustible solid material in segregated particles and hot gas into contact with each other in countercurrent direction while generating vapor with said gas, and heating liquid with said solid material preparatory to generating vapor therefrom with said gas.

19. The process which comprises passing non-combustible solid material in segregated particles and hot gas into contact with each other in countercurrent direction while generating vapor with said gas, and heating liquid with said solid material preparatory to generating vapor therefrom with said gas, said hot gas being produced by combustion of fuel and air.

20. The process which comprises passing non-combustible solid material in segregated particles and hot gas into contact with each other in countercurrent direction while generating vapor with said gas, heating liquid with said solid material preparatory to generating vapor therefrom with said gas, said hot gas being produced by combustion of fuel and air, and heating said air with said solid material before it enters into combustion.

21. The process which comprises passing non-combustible solid material in segregated particles and hot gas into contact with each other in countercurrent direction and generating vapor by radiant heat from said solid material while in contact with said hot gas and also after said gas has left the vapor generating zone.

22. The process which comprises passing non-combustible solid material in succession through cooling, combustion, ignition and preheating zones in direct contact with hot gases passing through said first three mentioned zones in the opposite direction, said combustion zone having steam generating surfaces in position to receive radiant heat from the heated solid particles.

23. The process which comprises passing non-combustible solid material in succession through cooling, combustion, ignition and preheating zones in direct contact with hot gases passing through said first three mentioned zones in the opposite direction, absorbing heat from said gases by said solid material in said cooling zone, imparting heat to a gas by said solid material in said preheating zone, and utilizing said absorbed heat in said combustion zone by radiation to steam generating surfaces.

24. The process which comprises passing non-combustible solid material in succession through cooling, combustion, ignition and preheating zones in direct contact with hot gases passing through said first three mentioned zones in the opposite direction, and generating vapors in proximity to said combustion zone by radiating heat to steam generating surfaces.

25. The process which comprises passing non-combustible solid material in succession through cooling, combustion, ignition and preheating zones in direct contact with gases passing through said zones in the opposite direction, generating vapors in proximity to said combustion zone out of contact with said solid material and gas, and heating liquid by means of said solid material after it has passed through said combustion zone and using this liquid from which to generate vapors.

HERMAN C. HEATON.

CERTIFICATE OF CORRECTION.

Patent No. 1,905,283. April 25, 1933.

HERMAN C. HEATON.

It is hereby certified that error appears in the printed specification of the above numbered patent requiring correction as follows: Page 3, line 93, claim 11, strike out the article "a"; page 4, line 15, claim 14, after "heater" insert the words "and communicating with it"; line 26, claim 15, after "other" insert "while said gas is undergoing combustion"; lines 83, 92, 104 and 113, claims 22, 23, 24 and 25, respectively, after "material" insert "in segregated particles"; and that the said Letters Patent should be read with these corrections therein that the same may conform to the record of the case in the Patent Office.

Signed and sealed this 25th day of July, A. D. 1933.

M. J. Moore.

(Seal) Acting Commissioner of Patents.